United States Patent
Kawamura et al.

(10) Patent No.: US 10,422,274 B2
(45) Date of Patent: Sep. 24, 2019

(54) CONTROL DEVICE FOR ACTUATOR, ACTUATOR, VALVE DRIVING DEVICE AND CONTROL METHOD FOR ACTUATOR

(71) Applicant: MITSUBISHI ELECTRIC CORPORATION, Tokyo (JP)

(72) Inventors: Satoshi Kawamura, Tokyo (JP); Kenta Hatano, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 64 days.

(21) Appl. No.: 15/558,334

(22) PCT Filed: Apr. 9, 2015

(86) PCT No.: PCT/JP2015/061105
§ 371 (c)(1),
(2) Date: Sep. 14, 2017

(87) PCT Pub. No.: WO2016/163001
PCT Pub. Date: Oct. 13, 2016

(65) Prior Publication Data
US 2018/0066574 A1 Mar. 8, 2018

(51) Int. Cl.
*F02B 37/18* (2006.01)
*F02D 41/24* (2006.01)
*F02D 23/00* (2006.01)
*F02D 41/14* (2006.01)
(Continued)

(52) U.S. Cl.
CPC ............ *F02B 37/18* (2013.01); *F02B 37/186* (2013.01); *F02D 23/00* (2013.01); *F02D 41/0002* (2013.01); *F02D 41/1401* (2013.01); *F02D 41/20* (2013.01); *F02D 41/2464* (2013.01); *F02D 2041/0015* (2013.01); *F02D 2041/1415* (2013.01); *Y02T 10/144* (2013.01); *Y02T 10/42* (2013.01)

(58) Field of Classification Search
CPC ........ F02B 37/18; F02B 37/186; F02D 41/20; F02D 41/1401; F02D 41/0002; F02D 41/2464; F02D 23/00; F02D 2041/1415; F02D 2041/0015; Y02T 10/42; Y02T 10/144
USPC .................................................. 60/600, 611
See application file for complete search history.

(56) References Cited

U.S. PATENT DOCUMENTS

| | | | | |
|---|---|---|---|---|
| 4,580,535 A | * | 4/1986 | Danno | ............. F02D 31/004 123/339.17 |
| RE33,027 E | * | 8/1989 | Danno | ............. F02D 31/004 123/339.22 |

(Continued)

FOREIGN PATENT DOCUMENTS

| | | |
|---|---|---|
| JP | 2000-110573 A | 4/2000 |
| JP | 2003-106185 A | 4/2003 |

(Continued)

*Primary Examiner* — Hoang M Nguyen
(74) *Attorney, Agent, or Firm* — Birch, Stewart, Kolasch & Birch, LLP

(57) ABSTRACT

A control device for an actuator learns a reference position of a shaft when the operation of the engine of a vehicle is not obstructed in a period during which the engine is operating, and performs feedback control by using the reference position learned thereby in such a way that the position of the shaft detected by a position sensor gets close to a target position.

8 Claims, 4 Drawing Sheets

(51) Int. Cl.
    *F02D 41/20*     (2006.01)
    *F02D 41/00*     (2006.01)

(56) References Cited

U.S. PATENT DOCUMENTS

| | | | |
|---|---|---|---|
| 5,005,359 A * | 4/1991 | Tashima | F02B 37/007 60/600 |
| 5,020,327 A * | 6/1991 | Tashima | F02B 37/001 60/600 |
| 2013/0140477 A1 | 6/2013 | Shimane | |
| 2014/0026559 A1 | 1/2014 | Shinagawa | |

FOREIGN PATENT DOCUMENTS

| | | |
|---|---|---|
| JP | 2009-62833 A | 3/2009 |
| JP | 2010-168909 A | 8/2010 |
| JP | 2013-117267 A | 6/2013 |
| JP | 2015-25409 A | 2/2015 |
| JP | 2015-40488 A | 3/2015 |
| JP | 2015-59549 A | 3/2015 |
| WO | WO 2012/137345 A1 | 10/2012 |

* cited by examiner

CONTROL DEVICE FOR ACTUATOR, ACTUATOR, VALVE DRIVING DEVICE AND CONTROL METHOD FOR ACTUATOR

TECHNICAL FIELD

The present invention relates to a control device for an actuator for driving an object to be driven, such as a valve, an actuator, a valve driving device and a control method for an actuator.

BACKGROUND ART

In the case of driving an object to be driven by using an actuator, it is important to learn a positional relationship between the actuator and the object to be driven, for the purpose of performing high-accuracy drive control. For example, in a reference opening position learning device according to Patent Literature 1, an intake air swirl control valve is driven to move to a reference position by an actuator at the time when an engine stops, and the reference position is learned from the degree of opening of the intake air swirl control valve which is detected by a position sensor.

However, as disclosed in above-mentioned Patent Literature 1, only the implementation of position learning at the time when the engine stops leads to a problem that a mechanism element gets warm and becomes deformed due to thermal expansion, and the reference position is shifted. Thus, a control valve opening and closing control device according to Patent Literature 2 learns a reference position from the degree of opening of an intake air swirl control valve which is detected by a position sensor when the intake air swirl control valve is driven to move to the reference position during operation of the engine.

CITATION LIST

Patent Literature

Patent Literature 1: Japanese Unexamined Patent Application Publication No. 2009-62833
Patent Literature 2: Japanese Unexamined Patent Application Publication No. 2010-168909

SUMMARY OF INVENTION

Technical Problem

The object to be driven is not necessarily driven to move to the reference position frequently during operation of the engine. Thus, even if configuration is made so as to learn the reference position by using the occasion when the object to be driven is driven to move to the reference position during operation of the engine, as disclosed in above-mentioned Patent Literature 2, the problem that the reference position is shifted by deformation due to thermal expansion still exists unless the object to be driven is driven to move to the reference position.

The present invention is made in order to solve the above-mentioned problem, and it is therefore an object of the present invention to provide a technique for increasing the frequency with which to learn a reference position, and improving the accuracy of the reference position.

Solution to Problem

A control device for an actuator according to the present invention includes: a feedback controller to perform feedback control on the actuator by using a reference position in an axial direction of the shaft in such a way that the position of the shaft detected by the position sensor gets close to a target position; and a position learner to, when the operation of an engine of the vehicle is not obstructed in a period during which the engine is operating, learn the reference position.

Advantageous Effects of Invention

According to the present invention, because the reference position of the shaft is learned when the operation of the engine of the vehicle is not obstructed during operation of the engine, the frequency with which to learn the reference position can be increased, and the accuracy of the reference position can be improved.

DESCRIPTION OF EMBODIMENTS

Hereafter, in order to explain this invention in greater detail, embodiments of the present invention will be described with reference to accompanying drawings.

Embodiment 1

A case of using an actuator according to the present invention as a wastegate (hereinafter referred to as WG) actuator that drives a WG valve of an engine equipped with a turbocharger that is mounted in a vehicle will be explained as an example.

Figure 1:
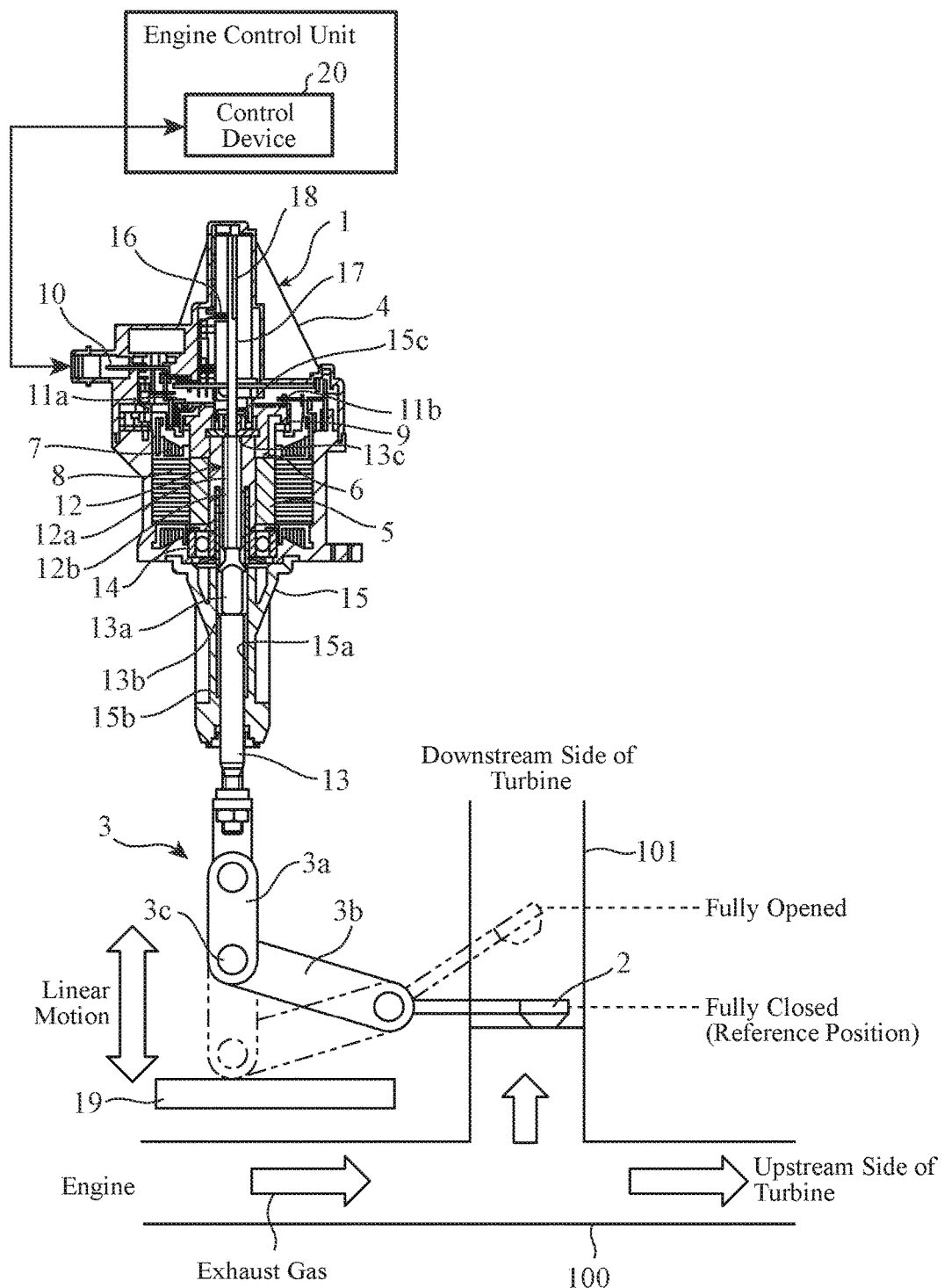
FIG. 1 is a cross-sectional view showing an example of the configuration of a wastegate actuator according to Embodiment 1 of the present invention.

FIG. 1 is a cross-sectional view showing an example of the configuration of a WG actuator 1 according to Embodiment 1. The turbocharger is configured so as to rotate a turbine by using an exhaust gas from an engine, drive a compressor connected with this turbine on the same axis, compress intake air, and supply this compressed intake air to the engine. A WG valve 2 for bypassing the exhaust gas from an exhaust passage 100 to a bypass passage 101 is disposed on an upstream side of the exhaust passage 100 with respect to the turbine. The number of rotations of the turbine is controlled by opening or closing the WG valve 2 to adjust the inflow of the exhaust gas from the exhaust passage 100 to the bypass passage 101 by means of the WG actuator 1. In FIG. 1, a solid line shows a fully closed state of the WG valve 2, and a chain double-dashed line shows a fully opened state of the WG valve 2.

The WG actuator 1 includes a direct-current motor 4 that serves as a driving source, a shaft 13 that opens and closes the WG valve 2, and a screw mechanism 12 that converts a rotary motion of the direct-current motor 4 into a linear motion of the shaft 13. The direct-current motor 4 includes a rotor 6 having a magnet 5 magnetized into a plurality of N and S poles, and a stator 8 on which coils 7 are wound. Brushes 11b are connected with ends of the coils 7. The rotor 6 is rotatably supported by a bearing portion 14 on one end side thereof, and a commutator 9 is fixed on the other end side of the rotor 6.

When a voltage is applied to an external terminal 10, currents flow through commutator bars in contact with brushes 11a, among plural commutator bars which configure the commutator 9, via the brushes 11a connected with this external terminal 10, and currents flow through coils 7 via the brushes 11b electrically connected with these commutator bars. The stator 8 is magnetized into an N pole and an S pole by the passage of the currents through the coils 7, and the N pole and the S pole of the stator 8 repel and attract the N pole and the S pole of the magnet 5 and this causes the rotor 6 to rotate. As the rotor 6 rotates, the coils 7 through which the currents are made to pass are switched and, as a result, the poles of the stator 8 are also switched and the rotor 6 continues rotating. When the directions of the currents are reversed, the direction of rotation of the rotor 6 is also reversed.

Although a DC motor with brushes is used as the direct-current motor 4 in the example shown in FIG. 1, a brushless DC motor may be used.

A hole used for disposing the shaft 13 is made inside the rotor 6, and a female screw portion 12a is formed on an inner circumferential surface of the hole and a male screw portion 12b is formed on an outer circumferential surface of the shaft 13. This male screw portion 12b is screwed into and coupled with the female screw portion 12a, and a rotary motion of the rotor 6 is converted into a linear motion of the shaft 13. The screw mechanism 12 consists of these female screw portion 12a and male screw portion 12b. One end of the shaft 13 penetrates the housing 15, and is joined to the WG valve 2 via a linkage mechanism 3. A position sensor 16 for detecting the position of this shaft 13 in an axial direction, and so on are disposed on the other end side of the shaft 13.

The linkage mechanism 3 has two plates 3a and 3b. The shaft 13 is attached on one end side of the plate 3a, and one end of the plate 3b is attached rotatably to a supporting point 3c disposed on the other end side of the plate 3a. The WG valve 2 is attached to the other end side of this plate 3b. When the shaft 13 moves in a direction in which the shaft 13 is pushed out from the housing 15 in response to a rotation in one direction of the rotor 6, the plate 3a also moves in the same direction, the plate 3b and the WG valve 2 rotate around the supporting point 3c, and the WG valve 2 moves in a valve opening direction. When the shaft 13 moves in a direction in which the shaft is retracted into the housing 15 in response to a rotation in a reverse direction of the rotor 6, the plate 3a also moves in the same direction, and the plate 3b and the WG valve 2 rotate around the supporting point 3c, and the WG valve 2 moves in a valve closing direction.

Two flat surfaces or the likes are formed on the shaft 13, and function as a rotation limiting portion 13a. Further, on an inner circumferential surface of a hole of the housing 15 which the shaft 13 penetrates, a guide portion 15a, such as two flat surfaces, is formed in such a way as to match the shape of the rotation limiting portion 13a. Sliding between the rotation limiting portion 13a and the guide portion 15a prevents the shaft 13 from rotating in synchronization with a rotation of the rotor 6, to support the shaft 13 in such away as to cause the shaft 13 to make a linear motion. A stopper 15b projecting toward the shaft 13 is formed at an end of the guide portion 15a. By causing a butting portion 13b which is shaped so as to project from the shaft 13 to come into contact with this stopper 15b, the shaft 13 is prevented from further making a linear motion in the valve opening direction. Similarly, a plate that functions as a stopper 15c is disposed at an end of the screw mechanism 12. By causing an end surface of the shaft 13 that functions as a butting portion 13c to come into contact with the stopper 15c, the shaft 13 is prevented from further moving in the valve closing direction.

In the plate that functions as the stopper 15c for the shaft 13, a hole having a diameter smaller than the outer diameter of the shaft 13 is formed, and a shaft for sensor 17 is made to pass through this hole, and an end surface of the shaft for sensor 17 is in contact with the end surface of the shaft 13. As a result, the shaft for sensor 17 also reciprocates in synchronization with a reciprocating motion in the axial direction of the shaft 13. A magnet for sensor 18 is fixed to this shaft for sensor 17, and, when the position of the magnet for sensor 18 with respect to the position sensor 16 changes due to the reciprocating motion of the shaft 13, a flux density passing through the position sensor 16 also changes. The position sensor 16 is a Hall element or a magnetoresistive element, and detects the flux density which changes due to the reciprocating motion of the shaft 13 and converts the flux density into an analog signal showing an actual stroke position of the shaft 13 and outputs the analog signal.

Figure 2:
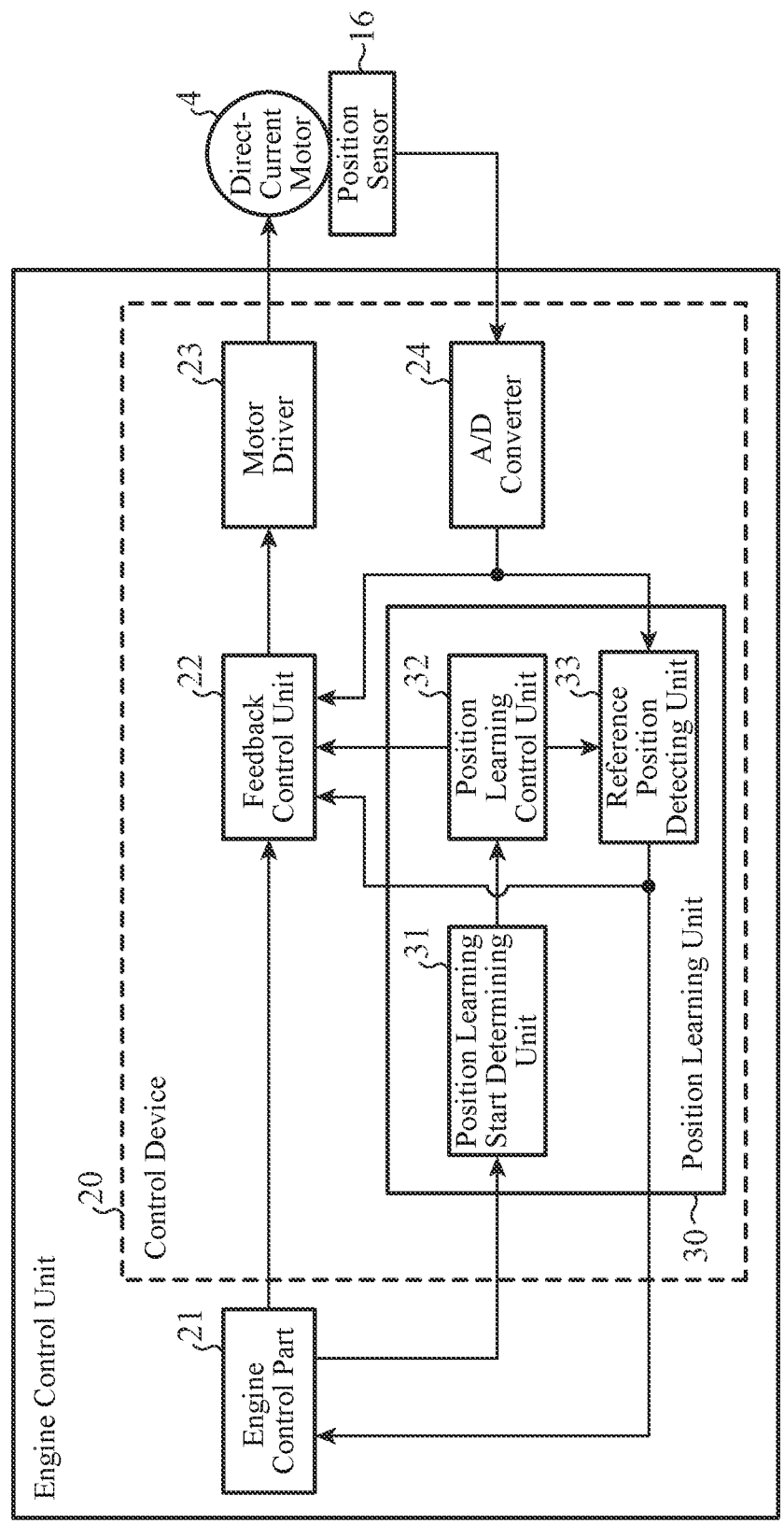
FIG. 2 is a block diagram showing an example of the configuration of a control device for the wastegate actuator according to Embodiment 1.

FIG. 2 is a block diagram showing an example of the configuration of a control device 20. The control device 20 mainly includes a function of controlling the WG actuator 1 to adjust the degree of opening of the WG valve 2, and a function of learning a reference position of the WG actuator 1. Although in the illustrated example the functions of the control device 20 are configured so as to be implemented as one function of an engine control unit, the control device 20 may be configured as an independent electronic control unit or may be incorporated, as a circuit board, into the WG actuator 1.

The engine control unit includes an engine control part 21 and the control device 20, and illustration and explanation of components other than these components will be omitted. The control device 20 includes a feedback control unit 22, a motor driver 23, an A/D converter 24 and a position learning unit 30. The position learning unit 30 includes a position learning start determining unit 31, a position learning control unit 32, and a reference position detecting unit 33.

The engine control part 21 outputs a target stroke position of the shaft 13 to the feedback control unit 22. In Embodiment 1, as an example, the engine control part 21 specifies the target stroke position by using, as a reference, a reference position of the shaft 13. The reference position corresponds to the position of the shaft 13 at the time when the WG valve 2 is fully closed, and a notification of the reference position is sent from the reference position detecting unit 33 to the engine control part 21.

The engine control part 21 also outputs vehicle information showing the information of the vehicle to the position learning start determining unit 31. The vehicle information includes, for example, information showing the driving state of the engine and a state showing the engine load. As the information showing the driving state of the engine, information showing the on/off state of an ignition (IG) key that indicates the start or stoppage of the engine, or the like is provided. As the information showing the engine load, information showing engine idling, information showing deceleration or acceleration of the vehicle, or the like is included. At a time when the engine load is low, such as a time of idling or a time of deceleration, the WG valve 2 is driven to move in the valve closing direction, whereas at a time when the engine load is high, such as a time of acceleration, the WG valve 2 is driven to move in the valve opening direction.

The A/D converter 24 receives the analog signal showing the actual stroke position of the shaft 13 outputted by the position sensor 16, converts the analog signal into a digital signal showing the actual stroke position, and outputs the digital signal to the feedback control unit 22 and the reference position detecting unit 33.

The feedback control unit 22 performs feedback control on the stroke position of the shaft 13 in such a way that the actual stroke position received from the A/D converter 24 gets close to the target stroke position received from the engine control part 21. By performing the feedback control on the stroke position of the shaft 13, the degree of opening of the WG valve 2 joined to the shaft 13 is adjusted. For example, when performing PID control, the feedback control unit 22 calculates the difference between the target stroke position and the actual stroke position, calculates amounts of operation which are a proportional term, an integral term and a differential term, these terms corresponding to the difference, to calculate drive duty, generates a PWM (Pulse Width Modulation) control signal corresponding to the drive duty, and outputs the PWM control signal to the motor driver 23.

In Embodiment 1, as an example, the feedback control unit 22 corrects the actual stroke position received from the A/D converter 24 by using the reference position of the shaft 13 of which the feedback control unit is notified by the reference position detecting unit 33, and uses the actual stroke position corrected thereby for the feedback control. As a result, high-accuracy feedback control using the reference position as a reference can be performed.

Further, when receiving an instruction to move the shaft 13 to the reference position, i.e., a position corresponding to a fully closed position of the WG valve 2, for the purpose of performing a position learning process of learning the reference position, from the position learning control unit 32, the feedback control unit 22 interrupts the above-mentioned feedback control which is performed at normal times, generates a PWM control signal to move the shaft 13 in accordance with the instruction from the position learning control unit 32, and outputs the PWM control signal to the motor driver 23.

The motor driver 23 performs on/off control on a voltage applied to the direct-current motor 4 in accordance with the PWM control signal received from the feedback control unit 22, to adjust a current passing through the direct-current motor 4.

The position learning start determining unit 31 determines whether or not to start the position learning process on the basis of the vehicle information received from the engine control part 21, and, when determining to start the position learning process, transmits a notification to that effect to the position learning control unit 32. For example, when the IG key changes from the off state to the on state and the engine starts, when the IG key changes from the on state to the off state and the engine stops, and when the engine is operating and the engine load is equal to or less than a predetermined threshold, the position learning start determining unit 31 determines to start the position learning process. Although in this example the position learning start determining unit is configured so as to define a time when the engine idles or the vehicle decelerates as a time when the engine load is equal to or less than the predetermined threshold, this embodiment is not limited to this example, and the level of the engine load may be determined on the basis of the number of rotations of the engine, the degree of opening of the throttle valve, or the like. When the engine load is equal to or less than the predetermined threshold, the target stroke position which is indicated by the engine control part 21 is either the fully closed position of the WG valve 2 or a position close to the fully closed position.

When receiving a notification of a start of the position learning process from the position learning start determining unit 31, the position learning control unit 32 outputs an instruction to move the shaft 13 to the reference position, i.e., the position corresponding to the fully closed position of the WG valve 2 to the feedback control unit 22. The position learning control unit 32 also outputs an instruction to detect the reference position to the reference position detecting unit 33.

When receiving the instruction to detect the reference position from the position learning control unit 32, the reference position detecting unit 33 receives the actual stroke position of the shaft 13 which has been moved through this position learning process from the A/D converter 24, and detects the reference position. The reference position detecting unit 33 notifies the engine control part 21 and the feedback control unit 22 of the detected reference position.

Hereafter, an example of a method of detecting the reference position corresponding to the fully closed position will be explained.

The position learning control unit 32 provides an instruction to move the shaft 13 to the position corresponding to the fully closed position of the WG valve 2 for the feedback control unit 22. The feedback control unit 22 causes the shaft 13 to move in the valve closing direction in which the shaft 13 is retracted into the housing 15 in accordance with the instruction from the position learning control unit 32, and presses the WG valve 2 against a valve seat to bring the WG valve into the fully closed state. The reference position detecting unit 33 detects, as the reference position corresponding to the fully closed position, the actual stroke position of the shaft 13 which is detected by the position sensor 16 in this state.

The reference position detecting unit 33 determines the fully closed state by using, for example, the following method. In a state in which the instruction to move the shaft 13 to the fully closed position of the WG valve 2 is outputted from the position learning control unit 32 to the feedback control unit 22, the reference position detecting unit 33 determines that the WG valve is in the fully closed state when a state in which the difference between the current actual stroke position detected by the position sensor 16 and the actual stroke position sampled immediately before the current sampling is equal to or less than a predetermined value, and the drive duty calculated by the feedback control unit 22 is equal to or less than a predetermined value continues during a predetermined time period. The reference position detecting unit 33 then calculates the average of the actual stroke positions which have been detected by the position sensor 16 during the predetermined time period, and detects, as the reference position corresponding to the fully closed position, the position which is expressed by this average.

Figure 3:
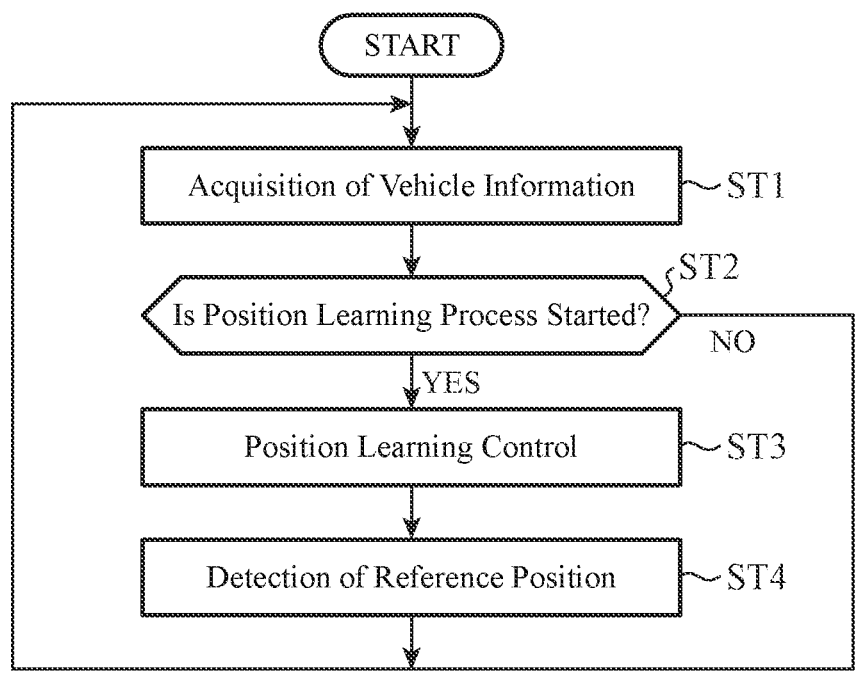
FIG. 3 is a flow chart showing an operation performed by the control device for the wastegate actuator according to Embodiment 1.

FIG. 3 is a flow chart showing the operation of the position learning unit 30. It is assumed hereafter that, in parallel to the operation which the position learning unit 30 performs in accordance with the flow chart of FIG. 3, the feedback control unit 22 performs the feedback control. The position learning start determining unit 31 receives the vehicle information from the engine control part 21 (step ST1), and determines whether or not to start the position learning process on the basis of the vehicle information (step ST2).

When determining to start the position learning process, the position learning start determining unit 31 outputs a notification of the start to the position learning control unit 32 ("YES" in step ST2). The position learning control unit 32 which has received this notification of the start outputs an instruction to move the shaft 13 to the position corresponding to the fully closed position of the WG valve 2 to the feedback control unit 22, and also outputs an instruction to detect the reference position to the reference position detecting unit 33 (step ST3). When receiving the notification of the start of the position learning process, the feedback control unit 22 interrupts the normal feedback control and performs the position learning control, to move the shaft 13 to the fully closed position. The reference position detecting unit 33 receives, via the A/D converter 24, the actual stroke position of the shaft 13 which is detected by the position sensor 16 in a state in which the shaft 13 has been moved to the fully closed position, and detects, as the reference position, the actual stroke position (step ST4). The reference position detecting unit 33 outputs the detected reference position to the engine control part 21 and the feedback control unit 22. After the reference position detecting unit 33 has detected the reference position, the feedback control unit 22 returns to the normal feedback control.

In contrast, when the position learning start determining unit 31, in step ST2, determines not to start the position learning process ("NO" in step ST2), no instruction for the position learning process is provided for the position learning control unit 32 by the position learning start determining unit 31, and accordingly the feedback control unit 22 continues the normal feedback control.

For example, by performing the position learning process when the IG key enters the on state, the reference position of the shaft 13 can be learned before the vehicle starts to travel, that is, before the WG actuator 1 is used. Thus, the feedback control can be performed with a high degree of accuracy.

Further, by performing the position learning process when the IG key enters the off state, the reference position of the shaft 13 can be learned before the vehicle starts to travel the next time, that is, before the WG actuator 1 is used the next time. Thus, the feedback control can be performed with a high degree of accuracy.

In both cases where the IG key enters the on state and where the IG key enters the off state, the position learning process may be performed. The position learning process may be performed in either case where the IG key enters the on state or where the IG key enters the off state.

Further, the position learning process is performed during the travel of the vehicle, in addition to the position learning process at least before or after the travel of the vehicle, so that even when a mechanism element gets warm and becomes deformed due to thermal expansion and the reference position is shifted, the reference position corresponding to the shift can be performed. Thus, the feedback control can be performed with a higher degree of accuracy than feedback control in the case where the reference position is learned only before or after the travel of the vehicle.

Because a time when the position learning process is performed during the travel of the vehicle is a time when the engine load becomes equal to or less than the threshold, the original target stroke position which is indicated by the engine control part 21 to the feedback control unit 22 is either the fully closed position of the WG valve 2 or a position close to the fully closed position, and therefore the normal operation of the engine equipped with the turbocharger is not obstructed even if the WG valve 2 is fully closed for the position learning process. A time when the position learning process is performed during the travel of the vehicle is not limited to a time when the engine load becomes equal to or less than the threshold, such as a time of idling a time of deceleration, but can be any time as long as the normal operation of the engine equipped with the turbocharger is not obstructed.

Although the above-mentioned control device 20 is configured so as to perform the position learning process also during the travel of the vehicle, in addition to the position learning process at least before or after the travel of the vehicle, the control device 20 may be configured so as to perform the position learning process only during the travel of the vehicle.

Further, although the example in which the above-mentioned control device 20 uses the reference position in order to correspond the actual stroke position to the target stroke position is explained, the use of the reference position is not limited to this example. For example, when performing soft landing control on the WG actuator 1, the control device 20 can set a soft landing start target position of the shaft 13 by using the reference position as a reference, and, when the actual stroke position of the shaft 13 is located on a side closer to the fully closed position with respect to the soft landing start target position, starts the deceleration of the shaft 13 to reduce a shock when the WG valve 2 is fully closed.

Figure 4:
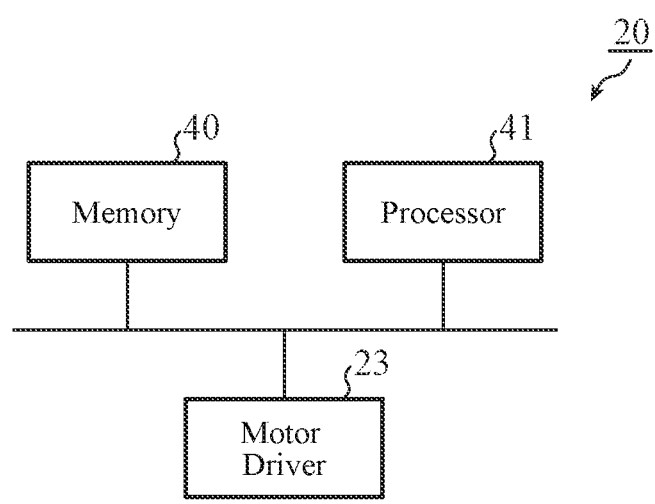
FIG. 4 is a diagram showing an example of the hardware configuration of the control device for the wastegate actuator according to Embodiment 1.

Next, an example of the hardware configuration of the control device 20 will be explained using FIG. 4.

The motor driver 23 is comprised of a switching element or the like that switches on and off the voltage applied to the direct-current motor 4. The feedback control unit 22, the A/D converter 24, and the position learning unit 30 are implemented by a processor 41 that executes a program stored in a memory 40. The processor 41 is a processing circuit such as a CPU or a system LSI. The memory 40 stores the threshold for the engine load with which the start of the position learning process is determined, the reference position detected by the reference position detecting unit 33 and so on, in addition to the above-mentioned program. Plural processors and plural memories can perform the above-mentioned functions in cooperation with one another.

As mentioned above, because the control device 20 for the WG actuator 1 according to Embodiment 1 is configured so as to include the feedback control unit 22 that performs feedback control on the WG actuator 1 by using the reference position in an axial direction of the shaft 13 in such a way that the position of the shaft 13 detected by the position sensor 16 gets close to the target position, and the position learning unit 30 that learns the reference position when the operation of the engine of the vehicle is not obstructed in a period during which the engine is operating, the frequency with which to learn the reference position can be increased to more than that provided by conventional techniques, and the accuracy of the reference position can be improved.

Further, according to Embodiment 1, because the position learning unit 30 is configured so as to, in the case in which the fully closed position of the WG valve 2 which is the object to be driven is used as the reference position of the shaft 13 in the feedback control unit 22, provide an instruction to move the shaft 13 to the fully closed position of the WG valve 2 for the feedback control unit 22, and learn, as the reference position, the position of the shaft 13 detected by the position sensor 16 when the engine load is equal to or less than the threshold in a period during which the engine of the vehicle is operating, the control device does not obstruct the normal operation of the engine equipped with the turbocharger, and, as a result, does not impose an influence on the vehicle that is traveling, when performing the position learning process.

The position learning unit 30 according to Embodiment 1 uses the fully closed position of the WG valve 2 as the reference position of the shaft 13. In contrast with this, a fully opened position of the WG valve 2 can be used as the reference position of the shaft 13.

Because at a time when the engine load becomes low, i.e., the engine load becomes equal to or less than the threshold, the normal operation of the engine equipped with the turbocharger is not obstructed even when the WG valve 2 is in the fully closed state or the fully opened state, it is possible to fully open the WG valve 2 in order to learn the reference position of the shaft 13.

Further, when the fully opened position of the WG valve 2 is used as the reference position, on the basis of the vehicle information, the position learning process can be started at a time when the engine load becomes high, e.g., a time when the vehicle accelerates. At a time which the engine load becomes high, the original target stroke position which is indicated by the engine control part 21 to the feedback control unit 22 is either the fully opened position of the WG valve 2 or a position close to the fully opened position, and therefore the normal operation of the engine equipped with the turbocharger is not obstructed even if the WG valve 2 is fully opened for the position learning process. For example, the position learning start determining unit 31 determines to start the position learning process on the basis of the vehicle information received from the engine control part 21 when the engine load is greater than the predetermined threshold.

In addition, also when, for example, the WG valve 2 is fully opened in order to warm a catalyst for purifying the exhaust gas, the reference position can be learned.

Herein, an example of a method of detecting the reference position corresponding to the fully opened position will be explained. This example is premised on a configuration of disposing a stopper 19 that comes into contact with the linkage mechanism 3 when the WG valve 2 is fully opened, to prevent the shaft 13 from further moving in the valve opening direction.

The position learning control unit 32 provides an instruction to move the shaft 13 to the position corresponding to the fully opened position of the WG valve 2 for the feedback control unit 22. The feedback control unit 22 causes the shaft 13 to move in the valve opening direction in which the shaft 13 is pushed out from the housing 15 in accordance with the instruction from the position learning control unit 32, and presses the linkage mechanism 3 against the stopper 19 to bring the WG valve into the fully opened state. The reference position detecting unit 33 detects, as the reference position corresponding to the fully opened position, the actual stroke position of the shaft 13 which is detected by the position sensor 16 in this state.

The reference position detecting unit 33 determines the fully opened state by using, for example, the following method. In a state in which the instruction to move the shaft 13 to the fully opened position of the WG valve 2 is outputted from the position learning control unit 32 to the feedback control unit 22, the reference position detecting unit 33 determines that the WG valve is in the fully opened state when a state in which the difference between the current actual stroke position detected by the position sensor 16 and the actual stroke position sampled immediately before the current sampling is equal to or less than a predetermined value, and the drive duty calculated by the feedback control unit 22 is equal to or less than a predetermined value continues during a predetermined time period. The reference position detecting unit 33 then calculates the average of the actual stroke positions which have been detected by the position sensor 16 during the predetermined time period, and detects, as the reference position corresponding to the fully opened position, the position which is expressed by this average.

Embodiment 2

Figure 5:
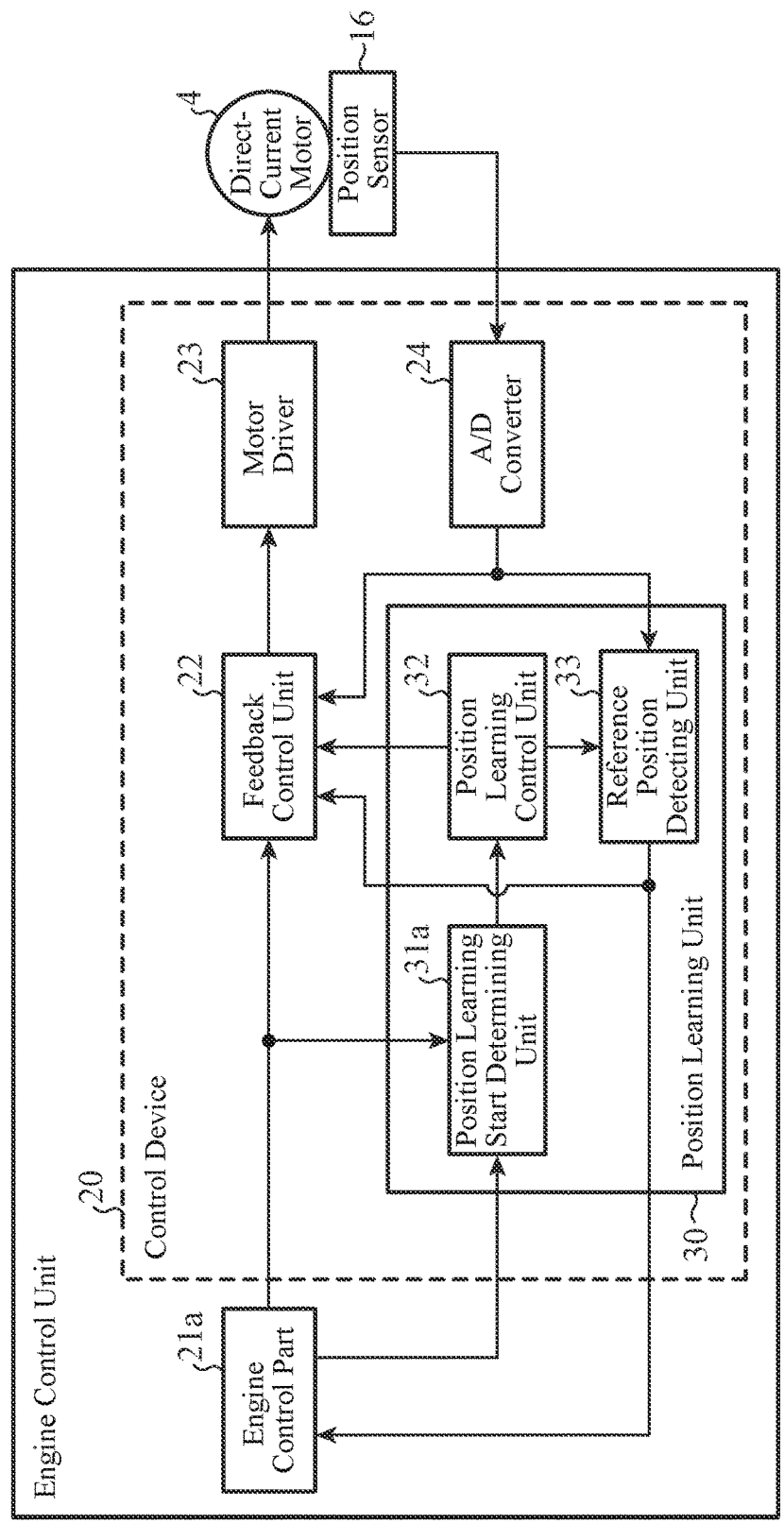
FIG. 5 is a block diagram showing an example of the configuration of a control device for a wastegate actuator according to Embodiment 2 of the present invention.

FIG. 5 is a block diagram showing an example of the configuration of a control device 20 for a WG actuator 1 according to Embodiment 2 of the present invention. In FIG. 5, the same components as those shown in FIG. 2 or like components are designated by the same reference numerals, and the explanation of the components will be omitted. Further, because the WG actuator 1 which is an object to be controlled by the control device 20 according to Embodiment 2 has the same configuration as that according to above-mentioned Embodiment 1, the WG actuator will be explained hereinafter using FIG. 1.

Further, in Embodiment 2, a case in which a position corresponding to a fully closed position of a WG valve 2 is used as a reference position of a shaft 13 will be explained as an example.

An engine control part 21a according to Embodiment 2 outputs a target stroke position of the shaft 13 not only to a feedback control unit 22 but also to a position learning start determining unit 31a. The engine control part 21a also outputs information showing an on/off state of an ignition key to the position learning start determining unit 31a as vehicle information.

The position learning start determining unit 31a determines whether or not an engine is operating on the basis of the vehicle information showing the on/off state of the ignition key which is received from the engine control part 21a. Further, when the target stroke position from the engine control part 21a falls within a predetermined range from the fully closed position which is the reference position in a period during which the engine is operating, the position learning start determining unit 31a determines to start a position learning process. The position learning start determining unit 31a then outputs a notification of the start of the position learning process to a position learning control unit 32.

The predetermined range from the reference position is, for example, a range which is used for determining whether or not the target stroke position is either the fully closed position of the WG valve 2 or a position close to the fully closed position, as explained in Embodiment 1, and in which a normal operation of the engine equipped with a turbocharger is not obstructed even if the WG valve 2 is fully closed for the position learning process.

When receiving a notification of a start of the position learning process from the position learning start determining unit 31a, the position learning control unit 32 outputs an instruction to move the shaft 13 to the reference position, i.e., the position corresponding to the fully closed position of the WG valve 2 to the feedback control unit 22. The position learning control unit 32 also outputs an instruction to detect, as the reference position, the position of the shaft 13 detected by a position sensor 16 to a reference position detecting unit 33. When the feedback control unit 22 has moved the shaft 13 to the position corresponding to the fully closed position of the WG valve 2, the reference position detecting unit 33 detects, as the reference position, the position of the shaft 13 detected by the position sensor 16.

As mentioned above, according to Embodiment 2, in the case in which the fully closed position of the WG valve 2 which is the object to be driven is used as the reference position of the shaft 13 in the feedback control unit 22, when the target position falls within a predetermined range from the fully closed position in a period during which the engine of the vehicle is operating, the position learning unit 30 is configured so as to provide an instruction to move the shaft 13 to the fully closed position for the feedback control unit 22 and learn, as the reference position, the position of the shaft 13 detected by the position sensor 16, so that the frequency with which to learn the reference position can be increased to more than that provided by conventional techniques, and the accuracy of the reference position can be improved. Further, when performing the position learning process, the normal operation of the engine equipped with the turbocharger is not obstructed, and, as a result, there is no influence on the vehicle that is traveling.

The fully closed position of the WG valve 2 is used as the reference position of the shaft 13 in the above-mentioned explanation. In contrast with this, the fully opened position of the WG valve 2 can be used as the reference position of the shaft 13. In that case, when the target stroke position notified from the engine control part 21*a* falls within a predetermined range from the fully opened position which is the reference position, the position learning start determining unit 31*a* determines to start the position learning process. The position learning control unit 32 outputs an instruction to move the shaft 13 to the reference position, i.e., the position corresponding to the fully opened position of the WG valve 2 to the feedback control unit 22, and also outputs an instruction to detect, as the reference position, the position of the shaft 13 detected by the position sensor 16 to the reference position detecting unit 33. As a result, like in the above-mentioned case, the frequency with which to learn the reference position can be increased to more than that provided by conventional techniques, and the accuracy of the reference position can be improved. Further, when performing the position learning process, the normal operation of the engine equipped with the turbocharger is not obstructed, and, as a result, there is no influence on the vehicle that is traveling.

It is to be understood that freely-selected combination of the above-mentioned embodiments can be made, various changes can be made in any component according to any one of the above-mentioned embodiments, and any component according to any one of the above-mentioned embodiments can be omitted within the scope of the invention.

Although in the above-mentioned explanation the WG valve is mentioned as an example of the object to be driven which is driven by the actuator according to the present invention, the present invention is not limited to this example. An exhaust gas recirculation (EGR) valve mounted in the engine, a movable vane mounted in a variable geometry (VG) turbocharger, or the like can be the object to be driven.

Further, although the configuration of joining the shaft of the actuator according to the present invention and the object to be driven by using the linkage mechanism is shown, a configuration of directly joining the shaft and the object to be driven without using the linkage mechanism can be alternatively provided.

Further, a valve driving device including the actuator according to the present invention, the valve which is the object to be driven, and the control device can be configured.

INDUSTRIAL APPLICABILITY

Because the control device for the actuator according to the present invention learns the reference position of the shaft during operation of the engine, the control device is suitable for use as a control device for an actuator which is affected by a temperature change.

REFERENCE SIGNS LIST

1 WG actuator, 2 WG valve (object to be driven), 3 linkage mechanism, 3*a*, 3*b* plate, 3*c* supporting point, 4 direct-current motor, 5 magnet, 6 rotor, 7 coil, 8 stator, 9 commutator, 10 external terminal, 11*a*, 11*b* brush, 12 screw mechanism, 12*a* female screw portion, 12*b* male screw portion, 13 shaft, 13*a* rotation limiting portion, 13*b*, 13*c* butting portion, 14 bearing portion, 15 housing, 15*a* guide portion, 15*b*, 15*c* stopper, 16 position sensor, 17 shaft for sensor, 18 magnet for sensor, 19 stopper, 20 control device, 21, 21*a* engine control unit, 22 feedback control unit, 23 motor driver, 24 A/D converter, 30 position learning unit, 31, 31*a* position learning control unit, 32 position learning control unit, 33 reference position detecting unit, 40 memory, 41 processor, 100 exhaust passage, and 101 bypass passage.

The invention claimed is:

1. A control device for an actuator, the actuator including a shaft for adjusting a degree of opening of an object to be driven which is mounted in a vehicle, a motor for causing the shaft to reciprocate in an axial direction, and a position sensor for detecting a position of the shaft, the control device controlling the motor to move the shaft to a new position based on feedback control, comprising:

a feedback controller to perform feedback control on the actuator by using a reference position in the axial direction of the shaft in such a way that the position of the shaft detected by the position sensor gets close to a target position; and a position learner to, when an operation of an engine of the vehicle is not obstructed and when the vehicle is travelling in a period during which the engine is operating, learn the reference position.

2. The control device for the actuator according to claim 1, wherein the feedback controller uses a fully closed position or a fully opened position of the object to be driven as the reference position of the shaft, and wherein when an engine load is equal to or less than a threshold in the period during which the engine of the vehicle is operating, the position learner provides an instruction to move the shaft to the fully closed position or the fully opened position for the feedback-controller, and learns, as the reference position, the position of the shaft detected by the position sensor.

3. The control device for the actuator according to claim 1, wherein the feedback controller uses a fully opened position of the object to be driven as the reference position of the shaft, and wherein when an engine load is greater than a threshold in the period during which the engine of the vehicle is operating, the position learner provides an instruction to move the shaft to the fully opened position for the feedback controller, and learns, as the reference position, the position of the shaft detected by the position sensor.

4. The control device for the actuator according to claim 1, wherein the feedback controller uses a fully closed position of the object to be driven as the reference position of the shaft, and wherein when the target position falls within a predetermined range from the fully closed position in the period during which the engine of the vehicle is operating, the position learner provides an instruction to move the shaft to the fully closed position for the feedback controller, and learns, as the reference position, the position of the shaft detected by the position sensor.

5. The control device for the actuator according to claim 1, wherein the feedback controller uses a fully opened position of the object to be driven as the reference position of the shaft, and, when the target position falls within a predetermined range from the fully opened position in the period during which the engine of the vehicle is operating, the position learner provides an instruction to move the shaft to the fully opened position for the feedback controller, and learns, as the reference position, the position of the shaft detected by the position sensor.

6. An actuator comprising:
a shaft for adjusting a degree of opening of an object to be driven which is mounted in a vehicle;
a motor for causing the shaft to reciprocate in an axial direction;
a position sensor for detecting a position of the shaft; and
the control device according to claim 1.

7. A valve driving device comprising:
an actuator including a shaft for adjusting a degree of opening of an object to be driven which is mounted in a vehicle, a motor for causing the shaft to reciprocate in an axial direction, and a position sensor for detecting a position of the shaft;
a valve that is driven by a reciprocating motion in the axial direction of the shaft; and
the control device according to claim 1.

8. A control method for an actuator including a shaft for adjusting a degree of opening of an object to be driven which is mounted in a vehicle, a motor for causing the shaft to reciprocate in an axial direction, and a position sensor for detecting a position of the shaft, the method for controlling the motor to move the shaft to a new position based on feedback control, comprising:
in a feedback controller of a control device, performing feedback control on the actuator by using a reference position in the axial direction of the shaft in such a way that the position of the shaft detected by the position sensor gets close to a target position, and
in a position learner of the control device, learning the reference position when an operation of an engine of the vehicle is not obstructed and when the vehicle is traveling in a period during which the engine is operating.

* * * * *